US010294369B2

(12) United States Patent
Chiku et al.

(10) Patent No.: US 10,294,369 B2
(45) Date of Patent: May 21, 2019

(54) REINFORCED POLY(PHENYLENE ETHER) COMPOSITIONS, AND ARTICLES PREPARED THEREFROM

(71) Applicant: SABIC Global Technologies B.V., Bergen op Zoom (NL)

(72) Inventors: Yukiyoshi Chiku, Moka (JP); Sho Sato, Utsunomiya (JP)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 0 days.

(21) Appl. No.: 15/569,985

(22) PCT Filed: May 13, 2015

(86) PCT No.: PCT/IB2015/053533
§ 371 (c)(1),
(2) Date: Oct. 27, 2017

(87) PCT Pub. No.: WO2016/181194
PCT Pub. Date: Nov. 17, 2016

(65) Prior Publication Data
US 2018/0155547 A1 Jun. 7, 2018

(51) Int. Cl.
C09D 183/08 (2006.01)
C08L 83/12 (2006.01)
C08K 5/523 (2006.01)
C08L 25/06 (2006.01)
C08L 71/12 (2006.01)
C08G 77/28 (2006.01)

(52) U.S. Cl.
CPC .............. C08L 83/12 (2013.01); C08K 5/523 (2013.01); C08L 25/06 (2013.01); C08L 71/12 (2013.01); C08L 71/126 (2013.01); C09D 183/08 (2013.01); C08G 77/28 (2013.01); C08L 2205/03 (2013.01); C08L 2666/40 (2013.01); Y02P 20/123 (2015.11)

(58) Field of Classification Search
None
See application file for complete search history.

(56) References Cited

U.S. PATENT DOCUMENTS

| 3,646,168 A | 2/1972 | Barrett |
| 4,154,775 A * | 5/1979 | Axelrod .................. C08K 5/527 524/120 |
| 4,226,761 A | 10/1980 | Cooper et al. |
| 4,814,392 A | 3/1989 | Shea et al. |
| 4,871,816 A | 10/1989 | Percec et al. |
| 5,061,746 A | 10/1991 | Gallucci et al. |
| 5,204,438 A | 4/1993 | Snow et al. |
| 5,281,686 A | 1/1994 | Blohm et al. |
| 5,294,654 A * | 3/1994 | Hellstern-Burnell ....................... C08K 5/523 524/127 |
| 5,357,003 A | 10/1994 | Smits et al. |
| 5,357,022 A | 10/1994 | Banach et al. |
| 5,364,898 A | 11/1994 | Lee et al. |
| 5,385,984 A | 1/1995 | Blohm et al. |
| 5,484,858 A | 1/1996 | Smits et al. |
| 5,596,048 A | 1/1997 | Blohm et al. |
| 5,693,700 A | 12/1997 | Venkataramani et al. |
| 6,339,131 B1 | 1/2002 | Cella et al. |
| 7,488,766 B2 | 2/2009 | Peters et al. |
| 7,541,421 B2 | 6/2009 | Carrillo et al. |
| 8,017,697 B2 | 9/2011 | Carrillo et al. |
| 8,252,858 B2 | 8/2012 | Kishore et al. |
| 8,530,552 B1 | 9/2013 | Takamura et al. |
| 8,557,937 B1 * | 10/2013 | Fisher ..................... C04B 24/26 526/209 |
| 9,193,868 B1 * | 11/2015 | Sato ........................ C08K 3/013 |
| 2007/0208144 A1 | 9/2007 | Delsman et al. |
| 2008/0071036 A1 | 3/2008 | Delsman et al. |
| 2008/0245270 A1 | 10/2008 | Klei et al. |
| 2008/0246186 A1 | 10/2008 | Fisher et al. |
| 2008/0248278 A1 | 10/2008 | Fisher et al. |
| 2009/0318635 A1 | 12/2009 | Carrillo et al. |
| 2009/0326113 A1 * | 12/2009 | Fortuyn .............. B29C 47/0023 524/148 |

(Continued)

FOREIGN PATENT DOCUMENTS

| CA | 2052488 A1 | 4/1992 |
| CN | 1111256 A | 11/1995 |

(Continued)

OTHER PUBLICATIONS

"Phosphorus-based flame retardants for thermoplastics", Plastics Addivtives & Compounding, Elsevier Science, Oxford, GB, vol. 9, No. 3, May 1, 2007; pp. 26-30.
Albemarle, "Saytex HP-3010, Flame Retardant", 2008 Albemarle Corporation, 2 pages.
Allen et al., "Synthesis and properties of xylenyl ether-dimethylsiloxane triblock polymers", Polymer Bulletin 19, 1988, pp. 103-110.
Clariant Exolit OP 1312, "Flame Retardants PHP", Edition Feb. 4, 2009, 2 pages.
Clariant Exolit Overview, Edition Nov. 2009, 8 pages.

(Continued)

Primary Examiner — Robert S Loewe
(74) Attorney, Agent, or Firm — Cantor Colburn LLP

(57) ABSTRACT

A composition includes specific amounts of a poly(phenylene ether), a poly(phenylene ether)-polysiloxane block copolymer, a homopolystyrene, a flame retardant, and a reinforcing filler. The composition exhibits a desirable balance of flame retardancy, heat resistance, stiffness, and melt flow. Articles that can be prepared from the composition include frames and chassis of office equipment, fuser module parts for printers, copiers, and facsimile machines, cooling fan blades, cooling fan housings, parts for automotive kinetic energy recovery systems, and parts for electric vehicle junction boxes.

18 Claims, No Drawings

(56) References Cited

U.S. PATENT DOCUMENTS

| | | | |
|---|---|---|---|
| 2010/0139944 A1* | 6/2010 | Guo | C08L 71/12 174/110 SR |
| 2010/0168293 A1* | 7/2010 | Sawant | C08L 69/00 524/125 |
| 2011/0152420 A1 | 6/2011 | Elkovitch et al. | |
| 2011/0152431 A1 | 6/2011 | Elkovitch et al. | |
| 2011/0152471 A1 | 6/2011 | Kamalakaran et al. | |
| 2011/0190453 A1 | 8/2011 | Carrillo et al. | |
| 2011/0190454 A1 | 8/2011 | Carrillo et al. | |
| 2012/0148817 A1 | 6/2012 | Riding | |
| 2012/0302679 A1* | 11/2012 | Lietzau | C08K 5/521 524/140 |
| 2012/0329961 A1 | 12/2012 | Carrillo et al. | |
| 2013/0030096 A1 | 1/2013 | Lietzau | |
| 2013/0197167 A1 | 8/2013 | Carrillo et al. | |
| 2013/0317142 A1* | 11/2013 | Chen | C08L 71/12 524/116 |
| 2014/0045979 A1* | 2/2014 | Ziegler | C08L 71/12 524/127 |
| 2014/0073725 A1 | 3/2014 | Tople et al. | |
| 2014/0128522 A1* | 5/2014 | Lietzau | C08K 5/52 524/122 |
| 2015/0322262 A1 | 11/2015 | Sato et al. | |
| 2016/0009902 A1 | 1/2016 | Sato et al. | |
| 2018/0016407 A1* | 1/2018 | Landa | C08J 9/0038 |

FOREIGN PATENT DOCUMENTS

| | | |
|---|---|---|
| CN | 102076769 A | 5/2011 |
| CN | 102245705 A | 11/2011 |
| CN | 103827220 A | 5/2014 |
| CN | 103842413 A | 6/2014 |
| CN | 104080858 A | 10/2014 |
| CN | 104704061 A | 6/2015 |
| DE | 3834086 A1 | 4/1990 |
| EP | 0433746 A2 | 6/1991 |
| EP | 0683209 A2 | 11/1995 |
| EP | 2256167 A1 | 12/2010 |
| GB | 1353501 A | 5/1974 |
| JP | 61252214 A | 11/1986 |
| JP | 1986252214 | 11/1986 |
| JP | 405230360 A | 9/1993 |
| JP | 6200038 A | 7/1994 |
| JP | 2004231769 A | 8/2004 |
| JP | 2011524440 A | 9/2011 |
| JP | 2017514970 A | 6/2017 |
| KR | 20140040832 A | 4/2014 |
| KR | 101644419 B1 | 8/2016 |
| KR | 101734165 B1 | 5/2017 |
| WO | 0140353 A1 | 6/2001 |
| WO | 2010068362 A | 6/2010 |
| WO | 2013003038 A2 | 1/2013 |
| WO | 2013015945 A2 | 1/2013 |
| WO | 2013115910 A1 | 8/2013 |
| WO | 2013175454 A1 | 11/2013 |
| WO | 2014039066 A1 | 3/2014 |
| WO | 2014074466 A1 | 5/2014 |
| WO | 2015171293 A1 | 11/2015 |

OTHER PUBLICATIONS

Final Office Action for U.S. Appl. No. 12/277,835, filed Nov. 25, 2008; dated Dec. 1, 2010; 12 pages.
Final Office Action for U.S. Appl. No. 12/644,144, filed Dec. 22, 2009; dated Feb. 14, 2012; 14 pages.
Final Office Action for U.S. Appl. No. 12/644,221, filed Dec. 22, 2009; dated Sep. 28, 2011; 21 pages.
Final Office Action for U.S. Appl. No. 12/644,221, filed Dec. 22, 2009; dated Dec. 24, 2013; 13 pages.
Final Office Action for U.S. Appl. No. 12/644,272, filed Dec. 22, 2009; dated Dec. 15, 2011; 14 pages.
Final Office Action for U.S. Appl. No. 13/043,502, filed Mar. 9, 2011; dated Dec. 16, 2011; 38 pages.
Final Office Action for U.S. Appl. No. 13/043,506, filed Mar. 9, 2001; dated Dec. 16, 2011; 12 pages.
Final Office Action for U.S. Appl. No. 13/189,651, filed Jul. 25, 2011; dated Sep. 6, 2013; 23 pages.
Final Office Action for U.S. Appl. No. 12/644,272, filed Dec. 22, 2009; dated Oct. 5, 2012; 12 pages.
International Search Report and Written Opinion for International Application No. PCT/US2009/045280, International Filing Date May 27, 2009; dated Jan. 11, 2010; 13 pages.
International Search Report for International Application No. PCT/US2012/037743, International Filing Date May 14, 2012, dated Nov. 29, 2012, 6 pages.
International Search Report for International Application No. PCT/IB2013/060646, International Filing Date Dec. 4, 2013, dated Mar. 18, 2014, 5 pages.
International Search Report for International Application No. PCT/US2009/064110, International Filing Date Nov. 12, 2009, dated May 27, 2009, 8 pages.
International Search Report for International Application No. PCT/US2012/042175; International Filing Date Jun. 13, 2012; dated Mar. 12, 2013; 5 pages.
International Search Report for International Application No. PCT/US2012/044897, International Application Filing Date: Jun. 29, 2011; dated Jan. 23, 2013; 5 pages.
International Search Report for International Application No. PCT/US2012/069337, International Application Filing Date Dec. 13, 2012; dated Apr. 22, 2013, 5 pages.
International Search Report for International Application No. PCT/US2012/069338, International Filing Date Dec. 13, 2012, dated May 30, 2013, 4 pages.
International Search Report for International Application No. PCT/US2012/069371; International Filing Date Dec. 13, 2012; dated May 27, 2013; 5 pages.
International Search Report for International Application No. PCT/US2015/026612, International Filing Date Apr. 20, 2015, dated Jul. 17, 2015, 5 pages.
International Search Report for International Application No. PCT/US2015/053533, International Filing Date May 13, 2015, dated Jan. 20, 2016; 5 pages.
International Search Report International Appln No. PCT/IB2016/051517; International Filing Date Mar. 17, 2016; dated Jun. 24, 2016; 10 pages.
Non-Final Office Action for U.S. Appl. No. 12/331,802, filed Dec. 10, 2008; dated Jan. 27, 2010; 13 pages.
Non-Final Office Action for U.S. Appl. No. 12/644,221, filed Dec. 22, 2009; dated May 2, 2011; 31 pages.
Non-Final Office Action for U.S. Appl. No. 12/644,221, filed Dec. 22, 2009; dated Jan. 8, 2015; 8 pages.
Non-Final Office Action for U.S. Appl. No. 12/644,221, filed Dec. 22, 2009; dated Jun. 27, 2014; 14 pages.
Non-Final Office Action for U.S. Appl. No. 12/644,272, filed Dec. 22, 2009; dated Jun. 6, 2012; 14 pages.
Non-Final Office Action for U.S. Appl. No. 12/644,272, filed Dec. 22, 2009; dated Jul. 18, 2011; 28 pages.
Non-Final Office Action for U.S. Appl. No. 13/043,502, filed Mar. 9, 2011; dated Jun. 2, 2011; 11 pages.
Non-Final Office Action for U.S. Appl. No. 13/043,506, filed Mar. 9, 2011; dated Sep. 15, 2011; 37 pages.
Non-Final Office Action for U.S. Appl. No. 13/189,651, filed Jul. 25, 2011; dated Mar. 18, 2013; 53 pages.
Non-Final Office Action for U.S. Appl. No. 13/189,651, filed Jul. 25, 2011; dated Apr. 16, 2014; 14 pages.
Non-Final Office Action for U.S. Appl. No. 13/362,426, filed Jan. 31, 2012; dated Oct. 28, 2013; 17 pages.
Non-Final Office Action for U.S. Appl. No. 13/570,301, filed Aug. 9, 2012; dated Sep. 10, 2013; 39 pages.
Non-Final Office Action for U.S. Appl. No. 13/650,366, filed Oct. 12, 2012; dated Jun. 19, 2014; 42 pages.
Non-Final Office Action for U.S. Appl. No. 13/650,366, filed Oct. 12, 2012; dated Dec. 5, 2013; 67 pages.
Non-Final Office Action for U.S. Appl. No. 14/270,408, filed May 6, 2014; dated Sep. 10, 2014; 26 pages.

(56) References Cited

OTHER PUBLICATIONS

Non-Final Office Action for U.S. Appl. No. 14/270,478, filed May 6, 2014; dated Mar. 11, 2015; 20 pages.
Non-Final Office Action U.S. Appl. No. 14/270,421, filed May 6, 2014; dated Sep. 9, 2014; 26 pages.
Non-Final Office Action U.S. Appl. No. 14/860,876, filed Sep. 22, 2015; dated Sep. 25, 2017; 29 pages.
Non-Final Rejection for U.S. Appl. No. 12/644,144, filed Dec. 22, 2009; dated Oct. 12, 2011; 30 pages.
Pape et al., "The Role of Silicone Powders in Reducing the Heat Release Rate and Evolution of Smoke in Flame Retardant Thermoplastics", Journal of Vinyl & Additive Technology, Sep. 1997, vol. 3, No. 3, pp. 225-232.
Skoog et al., "Principles of Instrumental Analysis", 4th Edition, Sanders College Publishing, 1992, pp. 568-578.
Written Opinion for International Application No. PCT/IB2010/055482, International Filing Date Nov. 29, 2010, dated May 13, 2011, 6 pages.
Written Opinion for International Application No. PCT/IB2013/060646, International Filing Date Dec. 4, 2013, dated Mar. 18, 2014, 10 pages.
Written Opinion for International Application No. PCT/US2009/064110, International Filing Date Nov. 12, 2009, dated May 27, 2010, 5 pages.
International Search Report for International Application No. PCT/US2013/068364; International Filing Date Nov. 5, 2013, dated Feb. 5, 2014, 5 pages.
Written Opinion for International Application No. PCT/US2012/037743, International Filing Date May 14, 2012, dated Nov. 28, 2012, 3 pages.
Written Opinion for International Application No. PCT/US2012/042175; International Filing Date Jun. 13, 2012; dated Mar. 12, 2013; 5 pages.
Written Opinion for International Application No. PCT/US2012/044897, International Filing Date Jun. 29, 2012, dated Jan. 23, 2013, 3 pages.
Written Opinion for International Application No. PCT/US2012/069337, International Filing Date Dec. 13, 2012, dated Apr. 22, 2013, 4 pages.
Written Opinion for International Application No. PCT/US2012/069338, International Filing Date Dec. 13, 2012, dated May 30, 2013, 4 pages.
Written Opinion for International Application No. PCT/US2012/069371; International Filing Date Dec. 13, 2012; dated May 27, 2013; 6 pages.
Written Opinion for International Application No. PCT/US2013/068364, International Filing Date Nov. 5, 2013, dated Feb. 5, 2014, 6 pages.
Written Opinion for International Application No. PCT/US2015/026612, International Filing Date Apr. 20, 2015, dated Jul. 17, 2015, 7 pages.
Written Opinion for International Application No. PCT/US2015/053533, International Filing Date May 13, 2015; dated Jan. 20, 2016; 6 pages.
Written Opinion for International Appln No. PCT/IB2016/051517; International Filing Date Mar. 17, 2016; dated Jun. 24, 2016; 10 pages.

* cited by examiner

REINFORCED POLY(PHENYLENE ETHER) COMPOSITIONS, AND ARTICLES PREPARED THEREFROM

CROSS-REFERENCE TO RELATED APPLICATIONS

This application is a National Stage application of PCT/IB2015/053533, filed May 13, 2015, which is incorporated by reference herein in its entirety.

BACKGROUND OF THE INVENTION

Poly(phenylene ether) is a type of plastic known for its excellent water resistance, dimensional stability, and inherent flame retardancy. Properties such as strength, stiffness, chemical resistance, and heat resistance can be tailored by blending it with various other plastics in order to meet the requirements of a wide variety of consumer and industrial products, for example, plumbing fixtures, electrical boxes, automotive parts, and insulation for wire and cable.

Some applications for poly(phenylene ether)-based compositions require significant flame retardant capability. Examples include molded articles in the construction, transportation, electronics, and solar power industries. Poly(phenylene ether) is inherently flame retardant, but it is often blended with other components, such as impact modifiers and flow promoters, that reduce the flame retardancy of the resulting composition even as they improve its processing and mechanical properties. So, flame retardant additives are often required for blends of poly(phenylene ether)s with these other components.

There remains a need for a poly(phenylene ether)-containing molding composition that exhibits improved flame retardancy, while preserving or modestly improving melt flow and stiffness, and while preserving or minimally compromising heat resistance.

BRIEF SUMMARY OF EMBODIMENTS OF THE INVENTION

One embodiment is a composition comprising, based on the total weight of polymers and fillers: 0.5 to 91 weight percent of a poly(phenylene ether)-polysiloxane block copolymer reaction product comprising a first poly(phenylene ether) and a poly(phenylene ether)-polysiloxane block copolymer; 1 to 50 weight percent of homopolystyrene; 3 to 25 weight percent of a flame retardant comprising an organophosphate ester, a phosphazene, or a combination thereof; and 5 to 40 weight percent of reinforcing filler.

Another embodiment is an article comprising a composition comprising, based on the total weight of polymers and fillers: 0.5 to 91 weight percent of a poly(phenylene ether)-polysiloxane block copolymer reaction product comprising a first poly(phenylene ether) and a poly(phenylene ether)-polysiloxane block copolymer; 1 to 50 weight percent of homopolystyrene; 3 to 25 weight percent of a flame retardant comprising an organophosphate ester, a phosphazene, or a combination thereof; and 5 to 40 weight percent of reinforcing filler.

These and other embodiments are described in detail below.

DETAILED DESCRIPTION OF THE INVENTION

The present inventors have determined that the composition described herein exhibits improved flame retardancy, melt flow, and stiffness, while only minimally compromising heat resistance. For example, as demonstrated in the working examples below, relative to corresponding comparative compositions containing rubber-modified polystyrene, inventive compositions containing homopolystyrene exhibit reduced average flame-out time in nine out of ten comparisons, increased flexural modulus in ten of ten comparisons, and increased melt volume flow rate in ten of ten comparisons. Inventive compositions exhibit reduced heat deflection temperatures relative to corresponding comparative examples, but the differences between inventive and comparative composition pairs are relatively small, ranging from 3 to 6 degrees centigrade.

Thus, one embodiment is a composition comprising, based on the total weight of polymers and fillers: 0.5 to 91 weight percent of a poly(phenylene ether)-polysiloxane block copolymer reaction product comprising a first poly(phenylene ether) and a poly(phenylene ether)-polysiloxane block copolymer; 1 to 50 weight percent of homopolystyrene; 3 to 25 weight percent of a flame retardant comprising an organophosphate ester, a phosphazene, or a combination thereof; and 5 to 40 weight percent of reinforcing filler.

The compositions comprise a poly(phenylene ether)-polysiloxane block copolymer reaction product which in turn comprises a poly(phenylene ether)-polysiloxane block copolymer and a poly(phenylene ether) homopolymer. For brevity, the poly(phenylene ether)-polysiloxane block copolymer reaction product is sometimes referred to herein as the "reaction product". The poly(phenylene ether)-polysiloxane block copolymer reaction product is synthesized by oxidative polymerization of a mixture of monohydric phenol and hydroxyaryl-terminated polysiloxane. This oxidative polymerization produces poly(phenylene ether)-polysiloxane block copolymer as the desired product and poly(phenylene ether) homopolymer as a by-product. It is difficult and unnecessary to separate the poly(phenylene ether) homopolymer from the poly(phenylene ether)-polysiloxane block copolymer. The poly(phenylene ether)-polysiloxane block copolymer is therefore incorporated into the present composition as a "poly(phenylene ether)-polysiloxane block copolymer reaction product" that comprises both the poly(phenylene ether) homopolymer and the poly(phenylene ether)-polysiloxane block copolymer.

The poly(phenylene ether)-polysiloxane block copolymer comprises a poly(phenylene ether) block and a polysiloxane block. The poly(phenylene ether) block is a residue of the polymerization of the monohydric phenol. In some embodiments, the poly(phenylene ether) block comprises phenylene ether repeating units having the structure

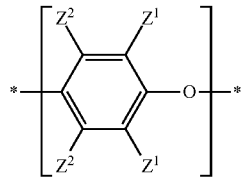

wherein for each repeating unit, each $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atom. In some embodiments, the poly(phenylene ether) block comprises 2,6-dimethyl-1,4-phenylene ether repeating units, that is, repeating units having the structure

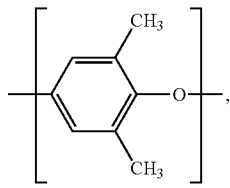

2,3,6-trimethyl-1,4-phenylene ether repeating units, or a combination thereof.

The polysiloxane block is a residue of the hydroxyaryl-terminated polysiloxane. In some embodiments, the polysiloxane block comprises repeating units having the structure

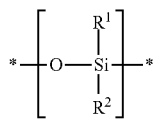

wherein each occurrence of $R^1$ and $R^2$ is independently hydrogen, $C_1$-$C_{12}$ hydrocarbyl or $C_1$-$C_{12}$ halohydrocarbyl; and the polysiloxane block further comprises a terminal unit having the structure

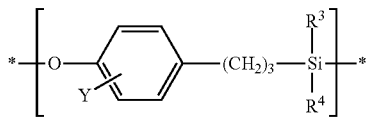

hydrocarbyl, $C_1$-$C_{12}$ wherein Y is hydrogen, $C_1$-$C_{12}$ hydrocarbyloxy, or halogen, and wherein each occurrence of $R^3$ and $R^4$ is independently hydrogen, $C_1$-$C_{12}$ hydrocarbyl or $C_1$-$C_{12}$ halohydrocarbyl. In some embodiments, the polysiloxane repeating units comprise dimethylsiloxane (—Si(CH$_3$)$_2$O—) units. In some embodiments, the polysiloxane block has the structure

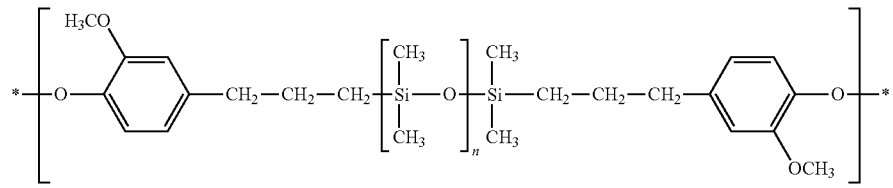

wherein n is, on average, about 20 to about 60.

The hydroxyaryl-terminated polysiloxane comprises at least one hydroxyaryl terminal group. In some embodiments, the hydroxyaryl-terminated polysiloxane has a single hydroxyaryl terminal group, in which case a poly(phenylene ether)-polysiloxane diblock copolymer is formed. In other embodiments, the hydroxyaryl-terminated polysiloxane has two hydroxyaryl terminal groups, in which case in which case poly(phenylene ether)-polysiloxane diblock copolymer and/or poly(phenylene ether)-polysiloxane-poly(phenylene ether) triblock copolymer are formed. It is also possible for the hydroxyaryl-terminated polysiloxane to have a branched structure that allows three or more hydroxyaryl terminal groups and the formation of corresponding branched block copolymers.

In some embodiments, the hydroxyaryl-terminated polysiloxane comprises, on average, about 20 to about 80 siloxane repeating units, specifically about 25 to about 70 siloxane repeating units, more specifically about 30 to about 60 siloxane repeating units, still more specifically about 35 to about 50 siloxane repeating units, yet more specifically about 40 to about 50 siloxane repeating units. The number of siloxane repeating units in the polysiloxane block is essentially unaffected by the copolymerization and isolation conditions, and it is therefore equivalent to the number of siloxane repeating units in the hydroxyaryl-terminated polysiloxane starting material. When not otherwise known, the average number of siloxane repeating units per hydroxylaryl-terminated polysiloxane molecule can be determined by nuclear magnetic resonance (NMR) methods that compare the intensities of signals associated with the siloxane repeating units to those associated with the hydroxyaryl terminal groups. For example, when the hydroxyaryl-terminated polysiloxane is a eugenol-capped polydimethylsiloxane, it is possible to determine the average number of siloxane repeating units by a proton nuclear magnetic resonance ($^1$H NMR) method in which integrals for the protons of the dimethylsiloxane resonance and the protons of the eugenol methoxy group are compared.

In some embodiments, the poly(phenylene ether)-polysiloxane block copolymer reaction product has a weight average molecular weight of at least 30,000 atomic mass units. For example, the reaction product can have a weight average molecular weight of 30,000 to about 150,000 atomic mass units, specifically about 35,000 to about 120,000 atomic mass units, more specifically about 40,000 to about 90,000 atomic mass units, even more specifically about 45,000 to about 70,000 atomic mass units. In some embodiments, the poly(phenylene ether)-polysiloxane block copolymer reaction product has a number average molecular weight of about 10,000 to about 50,000 atomic mass units, specifically about 10,000 to about 30,000 atomic mass units, more specifically about 14,000 to about 24,000 atomic mass units.

In some embodiments, the poly(phenylene ether)-polysiloxane block copolymer reaction product has an intrinsic viscosity of at least 0.3 deciliter per gram, as measured by Ubbelohde viscometer at 25° C. in chloroform. In some embodiments, the intrinsic viscosity is 0.3 to about 0.5 deciliter per gram, specifically 0.31 to about 0.5 deciliter per gram, more specifically about 0.35 to about 0.47 deciliter per gram.

One indication of the efficiency with which the hydroxyaryl-terminated polysiloxane is incorporated into block copolymer is the low concentration of so-called poly(phenylene ether) "tail" groups in the reaction product. In a homopolymerization of 2,6-dimethylphenol, a large fraction of product molecules have a so-called head-to-tail structure in which the linear product molecule is terminated on one end by a 3,5-dimethyl-4-hydroxyphenyl "head" and on the other end by a 2,6-dimethylphenoxy "tail". Thus, when the monohydric phenol consists of 2,6-dimethylphenol, the poly (phenylene ether) tail group has the structure

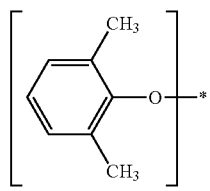

wherein the 3-, 4-, and 5-positions of the ring are substituted with hydrogen atoms (that is, the term "2,6-dimethylphenoxy" refers to a monovalent group and does not encompass divalent 2,6-dimethyl-1,4-phenylene ether groups). In a copolymerization of monohydric phenol with hydroxyaryl-terminated polysiloxane, incorporation of the hydroxyaryl-terminated polysiloxane into block copolymer will reduce the concentration of phenylene ether "tail" groups. Thus, in some embodiments, the monohydric phenol consists of 2,6-dimethylphenol, and the reaction product of comprises less than or equal to 0.4 weight percent, specifically 0.1 to 0.4 weight percent, of 2,6-dimethylphenoxy groups, based on the weight of the reaction product. The 2,6-dimethylphenoxy tail end groups are characteristic of poly(2,6-dimethyl-1,4-phenylene ether) homopolymer with a head-to-tail (hydroxy-monoterminated) structure in which the linear product molecule is terminated on one end by a 3,5-dimethyl-4-hydroxyphenyl "head" and on the other end by a 2,6-dimethylphenoxy "tail". So, the low concentration of 2,6-dimethylphenoxy tail end groups is an indication that the reaction product comprises a reduced concentration of such monofunctional homopolymer and an increased concentration of the desired poly(phenylene ether)-polysiloxane block copolymer.

The poly(phenylene ether)-polysiloxane block copolymer reaction product can further include groups derived from a diphenoquinone, which is itself an oxidation product of the monohydric phenol. For example, when the monohydric phenol is 2,6-dimethylphenol, the diphenoquinone is 3,3',5,5'-tetramethyl-4,4'-diphenoquinone. During the build phase of the copolymerization, the diphenoquinone is typically incorporated into the "tail" end of a head-to-tail poly(phenylene ether) as the corresponding biphenyl group. Through further reactions, the terminal biphenyl group can become an internal biphenyl group in the poly(phenylene ether) chain. In some embodiments, the monohydric phenol consists of 2,6-dimethylphenol, and the reaction product comprises 0.1 to 2.0 weight percent, and specifically 1.1 to 2.0 weight percent, of 2,6-dimethyl-4-(3,5-dimethyl-4-hydroxyphenyl)-phenoxy ("biphenyl") groups. The biphenyl groups are present only in bifunctional (head-to-head or hydroxyl-diterminated) structure. So, the low concentration of biphenyl group is an indication that the reaction product comprises a reduced concentration of such bifunctional homopolymer and an increased concentration of the desired poly(phenylene ether)-polysiloxane block copolymer.

Additional details relating to the preparation, characterization, and properties of the poly(phenylene ether)-polysiloxane block copolymer reaction product can be found in U.S. Pat. No. 8,017,697 to Carrillo et al., and U.S. Patent Application Publication No. US 2012/0329961 A1 of Carrillo et al.

The poly(phenylene ether)-polysiloxane block copolymer reaction product comprises about 1 to about 30 weight percent siloxane repeating units and about 70 to about 99 weight percent phenylene ether repeating units, based on the total weight of the reaction product. It will be understood that the siloxane repeating units are derived from the hydroxyaryl-terminated polysiloxane, and the phenylene ether repeating units are derived from the monohydric phenol. In some embodiments, such as, for example, when the poly(phenylene ether)-polysiloxane block copolymer reaction product is purified via precipitation in isopropanol, the siloxane repeating units consist essentially of the residue of hydroxyaryl-terminated polysiloxane that has been incorporated into the poly(phenylene ether)-polysiloxane block copolymer.

In some embodiments, the reaction product comprises about 1 to about 8 weight percent siloxane repeating units and about 12 to about 99 weight percent phenylene ether repeating units, based on the total weight of the reaction product. Within these ranges, the amount of siloxane repeating units can be 2 to 7 weight percent, specifically 3 to 6 weight percent, more specifically 4 to 5 weight percent; and the amount of phenylene ether repeating units can be 93 to 98 weight percent, specifically 94 to 97 weight percent, more specifically 95 to 96 weight percent.

The composition comprises the poly(phenylene ether)-polysiloxane block copolymer reaction product in an amount of 0.5 to 91 weight percent, based on the total weight of polymers and fillers. With this range, the reaction product amount can be 1 to 50 weight percent, specifically 2 to 20 weight percent, more specifically 2 to 10 weight percent.

In some embodiments the composition comprises a second poly(phenylene ether) in addition to the first poly (phenylene ether) contained in the poly(phenylene ether)-polysiloxane block copolymer reaction product. The second poly(phenylene ether) can be chemically the same as or different from the first poly(phenylene ether). Suitable first and second poly(phenylene ether)s include those comprising repeating structural units having the formula

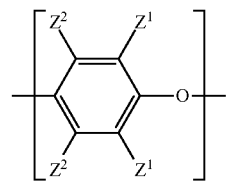

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

In some embodiments, the second poly(phenylene ether) has an intrinsic viscosity of 0.2 to 1 deciliter per gram measured by Ubbelohde viscometer at 25° C. in chloroform. Within this range, the second poly(phenylene ether) intrinsic viscosity can be 0.2 to 0.5 deciliter per gram, specifically 0.2 to 0.4 deciliter per gram, still more specifically 0.25 to 0.35 deciliter per gram.

In some embodiments, the second poly(phenylene ether) comprises 2,6-dimethyl-1,4-phenylene ether units, 2,3,6-trimethyl-1,4-phenylene ether units, or a combination thereof. In some embodiments, the second poly(phenylene ether) comprises a poly(2,6-dimethyl-1,4-phenylene ether). In some embodiments, the second poly(phenylene ether) comprises a poly(2,6-dimethyl-1,4-phenylene ether) having an intrinsic viscosity of 0.2 to 0.4 deciliter per gram, specifically 0.25 to 0.35 deciliter per gram, measured by Ubbelohde viscometer at 25° C. in chloroform.

When present, the second poly(phenylene ether) can be used in an amount of 5 to 90.5 weight percent, based on the total weight of polymers and fillers. Within this range, the amount of second poly(phenylene ether) can be 10 to 60 weight percent, specifically 15 to 40 weight percent. In specific embodiments, the composition comprises the poly(phenylene ether)-polysiloxane block copolymer reaction product in an amount of 2 to 20 weight percent, specifically 2 to 10 weight percent, and the second poly(phenylene ether) in an amount of 10 to 60 weight percent, specifically 15 to 50 weight percent, more specifically 25 to 45 weight percent.

The composition further comprises homopolystyrene. As used herein, the term "homopolystyrene" means a homopolymer of styrene. The residue of monomers other than styrene is thus excluded from the homopolystyrene. The homopolystyrene can be atactic, syndiotactic, isotactic, or a combination thereof. In some embodiments, the homopolystyrene comprises atactic homopolystyrene. In these embodiments, the atactic polystyrene can have a melt flow rate of 0.1 to 50 grams per 10 minutes measured at 200° C. and 5 kilogram load according to ASTM D 1238-13. Within this range, the melt flow rate can be 1 to 30 grams per 10 minutes, specifically 4 to 15 grams per 10 minutes.

The composition comprises the homopolystyrene in an amount of 1 to 50 weight percent, based on the total weight of polymers and fillers. Within this range, the homopolystyrene amount can be 5 to 45 weight percent, specifically 10 to 30 weight percent, more specifically 10 to 20 weight percent.

The composition further comprises a flame retardant. The flame retardant comprises an organophosphate ester, a phosphazene, or a combination thereof.

In some embodiments, the flame retardant comprises or consists of an organophosphate ester. Exemplary organophosphate ester flame retardants include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis(diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol A bis(diphenyl phosphate) (CAS Reg. No. 181028-79-5), triphenyl phosphate (CAS Reg. No. 115-86-6), tris(isopropylphenyl) phosphates (for example, CAS Reg. No. 68937-41-7), and combinations thereof.

In some embodiments the organophosphate ester comprises or consists of a bis-aryl phosphate having the formula

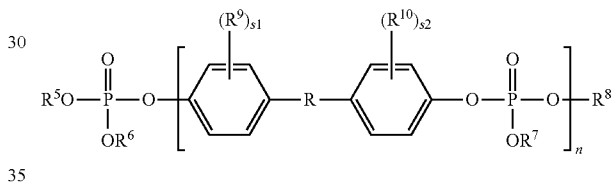

wherein R is independently at each occurrence a $C_1$-$C_{12}$ alkylene group; $R^9$ and $R^{10}$ are independently at each occurrence a $C_1$-$C_5$ alkyl group; $R^5$, $R^6$, and $R^8$ are independently a $C_1$-$C_{12}$ hydrocarbyl group; $R^7$ is independently at each occurrence a $C_1$-$C_{12}$ hydrocarbyl group; n is 1 to 25; and s1 and s2 are independently an integer equal to 0, 1, or 2. In some embodiments $OR^5$, $OR^6$, $OR^7$ and $OR^8$ are independently derived from phenol, a monoalkylphenol, a dialkylphenol, or a trialkylphenol.

As readily appreciated by one of ordinary skill in the art, the bis-aryl phosphate is derived from a bisphenol. Exemplary bisphenols include 2,2-bis(4-hydroxyphenyl)propane (bisphenol A), 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. In some embodiments, the bisphenol comprises bisphenol A.

In some embodiments, the flame retardant comprises a phosphazene. A phosphazene is a compound comprising repeating units having the structure

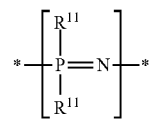

wherein each occurrence of $R^{11}$ is independently $C_1$-$C_6$ alkoxy, unsubstituted or substituted phenoxy, or unsubstituted or substituted naphthyloxy. When present, the substituents on the phenoxy or naphthyloxy groups can be, for example, $C_1$-$C_6$ alkyl, $C_1$-$C_6$ alkoxy, or phenyl.

In some embodiments, the phosphazene comprises a cyclic phosphazene having the structure

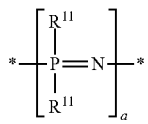

wherein $R^{11}$ is defined above and a is 3 to 12, specifically 3 to 6. In some embodiments, a is 3 and each occurrence of $R^{11}$ is unsubstituted phenoxy.

In some embodiments, the phosphazene comprises a linear polyphosphazene having the structure

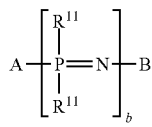

wherein $R^{11}$ is defined above; b is 3 to 1,000; A is —N=P(O)($R^{11}$) or —N=P($R^{11}$)$_3$; and B is —P($R^{11}$)$_4$ or —P(O)($R^{11}$)$_2$.

The phosphazene can be crosslinked with a phenylene group, a biphenylene group, or a group having the structure

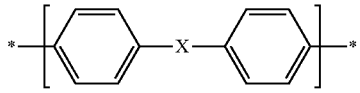

wherein X is $C_1$-$C_6$ alkylidene, O, S, or $SO_2$.

A mixture of at least two of cyclic phosphazenes, linear polyphosphazenes, and crosslinked phosphazenes can be used. In some embodiments, the phosphazene comprises at last 80 weight percent cyclic phosphazenes, based on the weight of the phosphazene.

Methods for making phosphazenes are known, and phosphazenes are commercially available as, for example, RABITLE™ FP-100 and RABITLE™ FP-110 from Fushimi Pharmaceutical Co., Ltd., IDB-Poretar-201 from ID-Biochem, and SPB-100 from Otsuka Chemical Company.

The amount of the organophosphate ester, phosphazene, or combination thereof can be 1 to 25 weight percent, based on the total weight of polymers and fillers. In some embodiments, the amount of the organophosphate ester, phosphazene, or combination thereof is 4 to 15 weight percent, specifically 4 to 12 weight percent, more specifically 4 to 10 weight percent. In other embodiments, the amount of the organophosphate ester, phosphazene, or combination thereof is 10 to 25 weight percent, specifically 15 to 25 weight percent.

In addition to the organophosphate ester and/or phosphazene, the flame retardant can, optionally, further comprise a dialkylphosphinate salt. As used herein, the term "dialkylphosphinate salt" refers to a salt comprising at least one cation and at least one dialkylphosphinate anion. In some embodiments, the dialkylphosphinate salt has the formula

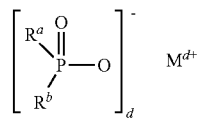

wherein $R^a$ and $R^b$ are each independently $C_1$-$C_6$ alkyl; M is calcium, magnesium, aluminum, zinc, ammonium, or hydrocarbyl-substituted ammonium; and d is 2 or 3. Examples of $R^a$ and $R^b$ include methyl, ethyl, n-propyl, isopropyl, n-butyl, tert-butyl, n-pentyl, and phenyl. In some embodiments, $R^a$ and $R^b$ are ethyl, M is aluminum, and d is 3 (that is, the dialkylphosphinate salt is aluminum tris(diethylphosphinate)).

In some embodiments, the dialkylphosphinate salt is in particulate form. The dialkylphosphinate salt particles can have a median particle diameter (D50) less than or equal to 40 micrometers, or, more specifically, a D50 less than or equal to 30 micrometers, or, even more specifically, a D50 less than or equal to 25 micrometers. Additionally, the dialkylphosphinate salt can be combined with a polymer, such as the poly(phenylene ether)-polysiloxane block copolymer reaction product, the second poly(phenylene ether), the homopolystyrene, or combination thereof, to form a masterbatch. Employing a masterbatch for the addition of the dialkylphosphinate salt to the other components of the composition can facilitate addition and improve distribution of the dialkylphosphinate salt.

In some embodiments, the dialkylphosphinate salt is used in an amount of 1 to 5 weight percent, specifically 1 to 3 weight percent, based on the total weight of polymers and fillers. When the amount of the organophosphate ester, phosphazene, or combination thereof is less than 4 weight percent, then the amount of dialkylphosphinate salt is sufficient to make the total flame retardant amount at least 4 weight percent. In some embodiments the composition comprises less than or equal to 1 weight percent of dialkylphosphinate salt, based on the total weight of the composition. In some embodiments the composition excludes dialkylphosphinate salt.

The composition comprises 3 to 25 weight percent of the flame retardant, based on the total weight of polymers and fillers. In some embodiments, the flame retardant amount is 3 to 20 weight percent, specifically 5 to 15 weight percent, more specifically 8 to 14 weight percent.

The composition comprises a reinforcing filler. Reinforcing fillers include, for example, glass fibers, carbon fibers, wollastonite, halloysite, clays, talcs, micas, glass flakes, solid glass beads, hollow glass beads, solid ceramic beads, hollow ceramic beads, and combinations thereof.

Suitable glass fibers include those based on E, A, C, ECR, R, S, D, and NE glasses, as well as quartz. In some embodiments, the glass fiber has a diameter of 2 to 30 micrometers, specifically 5 to 25 micrometers, more specifically 10 to 15 micrometers. In some embodiments, the length of the glass fibers before compounding is 2 to 7 millimeters, specifically 3 to 5 millimeters. Suitable glass fiber is commercially available from suppliers including, for example, Owens Corning, Nippon Electric Glass, PPG, and Johns Manville.

Suitable micas include those having forms known as muscovite, phlogopite, biotite, fluorophlogopite, lepidolite, and zinnwaldite. In some embodiments, the mica comprises phlogopite mica. The mica can be in the form of flakes having an average aspect ratio of 30:1 to 200:1, specifically 50:1 to 150:1. Suitable micas are available from suppliers including IMERYS Performance Minerals, Amit Enterprises, and Daruka Minerals.

In some embodiments, the reinforcing filler comprises glass fibers. In some embodiments, the reinforcing filler comprises mica. In some embodiments, the reinforcing filler comprises glass fibers and mica.

the poly(phenylene ether)-polysiloxane block copolymer comprises a poly(phenylene ether) block comprising repeat units selected from the group consisting of 2,6-dimethyl-1,4-phenylene ether, 2,3,6-trimethyl-1,4-phenylene ether, and combinations thereof; and a polysiloxane block having the structure

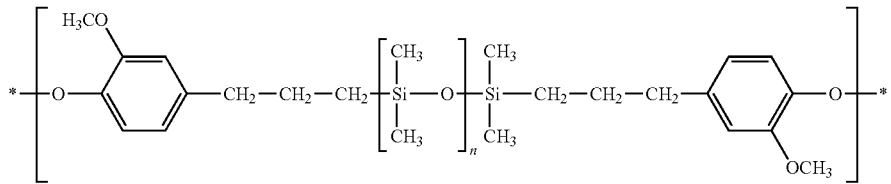

The composition comprises the reinforcing filler in an amount of 5 to 40 weight percent, based on the total weight of polymers and fillers. Within this range, the reinforcing filler amount can be 10 to 40 weight percent, specifically 15 to 35 weight percent, more specifically 15 to 25 weight percent. In some embodiments in which the composition comprises glass fibers and mica, the glass fibers can be present in an amount of 10 to 35 weight percent, specifically 15 to 30 weight percent, more specifically 15 to 25 weight percent, and the mica can be present in an amount of 5 to 30 weight percent, specifically 5 to 20 weight percent, more specifically 5 to 15 weight percent.

The composition can, optionally, further comprise one or more additives known in the thermoplastics art. For example, the composition can, optionally, further comprise an additive chosen from stabilizers, mold release agents, lubricants, processing aids, drip retardants, UV blockers, dyes, pigments, antioxidants, anti-static agents, mineral oil, metal deactivators, and the like, and combinations thereof. When present, such additives are typically used in a total amount of less than or equal to 5 weight percent, specifically less than or equal to 4 weight percent, more specifically less than or equal to 3 weight percent, still more specifically less than or equal to 2 weight percent, based on the total weight of polymers and fillers.

The composition can, optionally, exclude components not described herein as required. For example, in some embodiments, the composition excludes impact modifiers. Impact modifiers include, for example, rubber-modified polystyrenes, unhydrogenated block copolymers of an alkenyl aromatic monomer and a conjugated diene, hydrogenated block copolymers of an alkenyl aromatic monomer and a conjugated diene, acrylate core-shell impact modifiers (e.g., those having a crosslinked poly(butyl acrylate) core and a grafted poly(methyl methacrylate) shell), and combinations thereof. In some embodiments, the composition excludes polyesters. In some embodiments the composition excludes polyamides. In some embodiments, the composition excludes polyolefins. Alternatively, the composition can comprise up to 3 weight percent, specifically up to 2 weight percent, of a polyolefin acting as a mold release agent (e.g., linear low density polyethylene).

In a very specific embodiment of the composition, the poly(phenylene ether)-polysiloxane block copolymer reaction product has an intrinsic viscosity of 0.3 to 0.5 deciliter per gram measured at 25° C. in chloroform; the first poly (phenylene ether) comprises repeat units selected from the group consisting of 2,6-dimethyl-1,4-phenylene ether, 2,3,6-trimethyl-1,4-phenylene ether, and combinations thereof;

wherein n is, on average, 20 to 60; wherein the composition further comprises a second poly(phenylene ether) comprising repeat units selected from the group consisting of 2,6-dimethyl-1,4-phenylene ether, 2,3,6-trimethyl-1,4-phenylene ether, and combinations thereof; wherein the homopolystyrene is an atactic homopolystyrene; wherein the flame retardant is selected from the group consisting of resorcinol bis(diphenyl phosphate), bisphenol A bis(diphenyl phosphate), and combinations thereof; wherein the reinforcing filler comprises glass fibers and mica; and wherein the composition comprises 2 to 10 weight percent of the poly(phenylene ether)-polysiloxane block copolymer reaction product, 25 to 45 weight percent of the second poly (phenylene ether), 15 to 40 weight percent of the homopolystyrene, 4 to 12 weight percent of the flame retardant, and 20 to 40 weight percent of the reinforcing filler.

The composition can be prepared by melt-blending or melt-kneading the components of the composition. The melt-blending or melt-kneading can be performed using common equipment such as ribbon blenders, HENSCHEL™ mixers, BANBURY™ mixers, drum tumblers, single-screw extruders, twin-screw extruders, multi-screw extruders, co-kneaders, and the like. For example, the present composition can be prepared by melt-blending the components in a twin-screw extruder at a temperature of 280 to 310° C., specifically 290 to 305° C.

Another embodiment is an article comprising the composition. Thus, one embodiment is an article comprising a composition comprising, based on the total weight of polymers and fillers: 0.5 to 91 weight percent of a poly(phenylene ether)-polysiloxane block copolymer reaction product comprising a first poly(phenylene ether) and a poly (phenylene ether)-polysiloxane block copolymer; 1 to 50 weight percent of homopolystyrene; 3 to 25 weight percent of a flame retardant comprising an organophosphate ester, a phosphazene, or a combination thereof; and 5 to 40 weight percent of reinforcing filler.

The composition is particularly suitable for forming articles such as frames and chassis of office equipment including electrophotographic copier chassis, facsimile machine chassis, printer chassis, personal computer frames), fuser module parts for printers, copiers, and facsimile machines (including fuser holders, fuser covers, and fuser paper guides), cooling fan blades, cooling fan housings, parts for automotive kinetic energy recovery systems, and parts for electric vehicle junction boxes. All of the variations described above in the context of the composition apply as well to the article comprising the composition. Suitable methods of forming such articles include single layer and multilayer sheet extrusion, injection molding, blow molding, profile extrusion, pultrusion, compression molding, thermoforming, pressure forming, hydroforming, vacuum forming, and the like. Combinations of the foregoing article fabrication methods can be used.

In a very specific embodiment of the article, the poly(phenylene ether)-polysiloxane block copolymer reaction product has an intrinsic viscosity of 0.3 to 0.5 deciliter per gram measured at 25° C. in chloroform; the first poly(phenylene ether) comprises repeat units selected from the group consisting of 2,6-dimethyl-1,4-phenylene ether, 2,3,6-trimethyl-1,4-phenylene ether, and combinations thereof; the poly(phenylene ether)-polysiloxane block copolymer comprises a poly(phenylene ether) block comprising repeat units selected from the group consisting of 2,6-dimethyl-1,4-phenylene ether, 2,3,6-trimethyl-1,4-phenylene ether, and combinations thereof; and a polysiloxane block having the structure

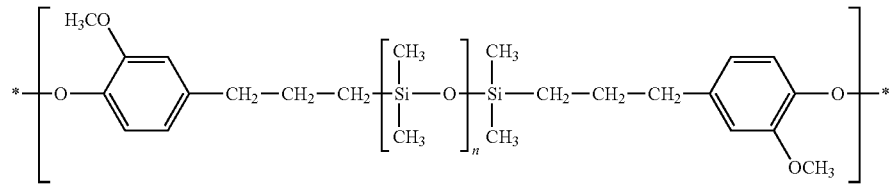

wherein n is, on average, 20 to 60; the composition further comprises a second poly(phenylene ether) comprising repeat units selected from the group consisting of 2,6-dimethyl-1,4-phenylene ether, 2,3,6-trimethyl-1,4-phenylene ether, and combinations thereof; the homopolystyrene is an atactic homopolystyrene; the flame retardant is selected from the group consisting of resorcinol bis(diphenyl phosphate), bisphenol A bis(diphenyl phosphate), and combinations thereof; the reinforcing filler comprises glass fibers and mica; and the composition comprises 2 to 10 weight percent of the poly(phenylene ether)-polysiloxane block copolymer reaction product, 25 to 45 weight percent of the second poly(phenylene ether), 15 to 40 weight percent of the homopolystyrene, 4 to 12 weight percent of the flame retardant, and 20 to 40 weight percent of the reinforcing filler.

The invention includes at least the following embodiments.

Embodiment 1: A composition comprising, based on the total weight of polymers and fillers: 0.5 to 91 weight percent of a poly(phenylene ether)-polysiloxane block copolymer reaction product comprising a first poly(phenylene ether) and a poly(phenylene ether)-polysiloxane block copolymer; 1 to 50 weight percent of homopolystyrene; 3 to 25 weight percent of a flame retardant comprising an organophosphate ester, a phosphazene, or a combination thereof; and 5 to 40 weight percent of reinforcing filler.

Embodiment 2: The composition of embodiment 1, further comprising 5 to 90.5 weight percent of a second poly(phenylene ether).

Embodiment 3: The composition of embodiment 1, comprising 2 to 20 weight percent of the poly(phenylene ether)-polysiloxane block copolymer reaction product, and 10 to 60 weight percent of the second poly(phenylene ether).

Embodiment 4: The composition of any one of embodiments 1-3, excluding impact modifiers.

Embodiment 5: The composition of any one of embodiments 1-4, wherein the homopolystyrene comprises an atactic homopolystyrene.

Embodiment 6: The composition of any one of embodiments 1-5, wherein the flame retardant comprises the organophosphate ester.

Embodiment 7: The composition of any one of embodiments 1-6, wherein the reinforcing filler is selected from the group consisting of glass fibers, carbon fibers, wollastonite, halloysite, clays, talcs, micas, glass flakes, solid glass beads, hollow glass beads, solid ceramic beads, hollow ceramic beads, and combinations thereof.

Embodiment 8: The composition of any one of embodiments 1-7, wherein the reinforcing filler comprises glass fibers.

Embodiment 9: The composition of any one of embodiments 1-8, wherein the reinforcing filler comprises mica.

Embodiment 10: The composition of embodiment 1, wherein the poly(phenylene ether)-polysiloxane block copolymer reaction product has an intrinsic viscosity of 0.3 to 0.5 deciliter per gram measured at 25° C. in chloroform; wherein the first poly(phenylene ether) comprises repeat units selected from the group consisting of 2,6-dimethyl-1,4-phenylene ether, 2,3,6-trimethyl-1,4-phenylene ether, and combinations thereof; wherein the poly(phenylene ether)-polysiloxane block copolymer comprises a poly(phenylene ether) block comprising repeat units selected from the group consisting of 2,6-dimethyl-1,4-phenylene ether, 2,3,6-trimethyl-1,4-phenylene ether, and combinations thereof; and a polysiloxane block having the structure

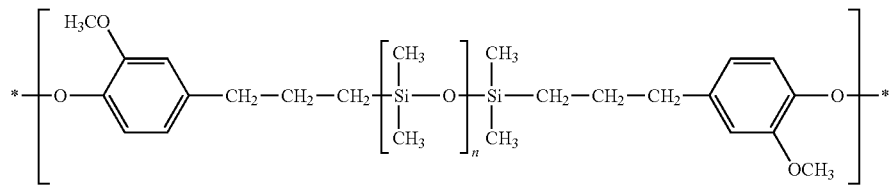

wherein n is, on average, 20 to 60; wherein the composition further comprises a second poly(phenylene ether) comprising repeat units selected from the group consisting of 2,6-dimethyl-1,4-phenylene ether, 2,3,6-trimethyl-1,4-phenylene ether, and combinations thereof; wherein the homopolystyrene is an atactic homopolystyrene; wherein the flame retardant is selected from the group consisting of resorcinol bis(diphenyl phosphate), bisphenol A bis(diphenyl phosphate), and combinations thereof; wherein the reinforcing filler comprises glass fibers and mica; and wherein the composition comprises 2 to 10 weight percent of the poly(phenylene ether)-polysiloxane block copolymer reaction product, 25 to 45 weight percent of the second poly(phenylene ether), 15 to 40 weight percent of the homopolystyrene, 4 to 12 weight percent of the flame retardant, and 20 to 40 weight percent of the reinforcing filler comprising 10 to 35 weight percent of the glass fibers and 5 to 30 weight percent of the mica.

Embodiment 11: An article comprising a composition comprising, based on the total weight of polymers and fillers: 0.5 to 91 weight percent of a poly(phenylene ether)-polysiloxane block copolymer reaction product comprising a first poly(phenylene ether) and a poly(phenylene ether)-polysiloxane block copolymer; 1 to 50 weight percent of homopolystyrene; 3 to 25 weight percent of a flame retardant comprising an organophosphate ester, a phosphazene, or a combination thereof; and 5 to 40 weight percent of reinforcing filler.

Embodiment 12: The article of embodiment 11, selected from the group consisting of frames and chassis of office equipment, fuser module parts for printers, copiers, and facsimile machines, cooling fan blades, cooling fan housings, parts for automotive kinetic energy recovery systems, and parts for electric vehicle junction boxes.

Embodiment 13: The article of embodiment 11 or 12, wherein the composition further comprises 5 to 90.5 weight percent of a second poly(phenylene ether).

Embodiment 14: The article of any one of embodiments 11-13, wherein the composition excludes impact modifiers.

Embodiment 15: The article of any one of embodiments 11-14, wherein the homopolystyrene comprises an atactic homopolystyrene.

Embodiment 16: The article of any one of embodiments 11-15, wherein the flame retardant comprises the organophosphate ester.

Embodiment 17: The article of any one of embodiments 11-16, wherein the reinforcing filler is selected from the group consisting of glass fibers, carbon fibers, wollastonite, halloysite, clays, talcs, micas, glass flakes, solid glass beads, hollow glass beads, solid ceramic beads, hollow ceramic beads, and combinations thereof.

Embodiment 18: The article of any one of embodiments 11-17, wherein the reinforcing filler comprises glass fibers.

Embodiment 19: The article of any one of embodiments 11-18, wherein the reinforcing filler comprises mica.

Embodiment 20: The article of embodiment 11 or 12, wherein the poly(phenylene ether)-polysiloxane block copolymer reaction product has an intrinsic viscosity of 0.3 to 0.5 deciliter per gram measured at 25° C. in chloroform; wherein the first poly(phenylene ether) comprises repeat units selected from the group consisting of 2,6-dimethyl-1,4-phenylene ether, 2,3,6-trimethyl-1,4-phenylene ether, and combinations thereof; wherein the poly(phenylene ether)-polysiloxane block copolymer comprises a poly(phenylene ether) block comprising repeat units selected from the group consisting of 2,6-dimethyl-1,4-phenylene ether, 2,3,6-trimethyl-1,4-phenylene ether, and combinations thereof; and a polysiloxane block having the structure

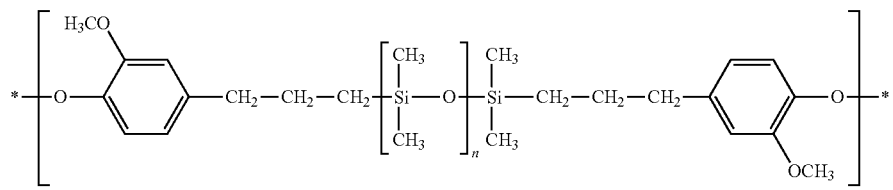

wherein n is, on average, 20 to 60; wherein the composition further comprises a second poly(phenylene ether) comprising repeat units selected from the group consisting of 2,6-dimethyl-1,4-phenylene ether, 2,3,6-trimethyl-1,4-phenylene ether, and combinations thereof; wherein the homopolystyrene is an atactic homopolystyrene; wherein the flame retardant is selected from the group consisting of resorcinol bis(diphenyl phosphate), bisphenol A bis(diphenyl phosphate), and combinations thereof; wherein the reinforcing filler comprises glass fibers and mica; and wherein the composition comprises 2 to 10 weight percent of the poly(phenylene ether)-polysiloxane block copolymer reaction product, 25 to 45 weight percent of the second poly(phenylene ether), 15 to 40 weight percent of the homopolystyrene, 4 to 12 weight percent of the flame retardant, and 20 to 40 weight percent of the reinforcing filler comprising 10 to 35 weight percent of the glass fibers and 5 to 30 weight percent of the mica.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

Examples 1-7, Comparative Examples 1-6

Components used to form the compositions are summarized in Table 1

TABLE 1

| Component | Description |
|---|---|
| PPE 0.33 | Poly(2,6-dimethyl-1,4-phenylene ether), CAS Reg. No. 25134-01-4, having an intrinsic viscosity of about 0.33 deciliter per gram as measured in chloroform at 25° C.; obtained as PPO ™ 630 from SABIC Innovative Plastics. |
| PPE 0.46 | Poly(2,6-dimethyl-1,4-phenylene ether), CAS Reg. No. 25134-01-4, having an intrinsic viscosity of about 0.46 deciliter per gram as measured in chloroform at 25° C.; obtained as PPO ™ 646 from SABIC Innovative Plastics. |
| PPE-Si | A mixture of poly(2,6-dimethyl-1,4-phenylene ether) (CAS Reg. No. 25134-01-4) and poly(2,6-dimethyl-1,4-phenylene ether)-polydimethylsiloxane block copolymer (CAS Reg. No. 1202019-56-4), the mixture having a polysiloxane content of about 5 weight percent and an intrinsic viscosity of about 0.40 deciliter per gram as measured in chloroform at 25° C.; preparable according to the procedure of U.S. Patent No. 8,017,697 to Carrillo et al., Example 16. |
| PS | Atactic polystyrene, CAS Reg. No. 9003-53-6, having a mineral oil content of less than 2 weight percent and a melt flow rate of 8 grams per 10 minutes measured at 200° C. and 5 kilogram load; obtained as DICSTYRENE ™ GPPS CR-3500 from DIC Corporation. |
| PPE/PS | Melt blend of 90 weight percent PPE 0.33 and 10 weight percent PS. |
| HIPS | High-impact polystyrene (rubber-modified polystyrene), CAS Reg. No. 9003-55-8, having a polystyrene content of about 91 weight percent and a polybutadiene content of about 9 weight percent; obtained as Idemitsu PS ET60 from Idemitsu. |
| Glass Fiber | Chopped glass fiber having a diameter of about 13 micrometers, a pre-compounded length of about 3.5 millimeters; obtained as CS 3PE-291 from Nittobo. |
| Mica | Phlogopite mica, having a mean particle diameter of about 50 micrometers and an average aspect ratio of about 45; obtained as REPCO MICA S-200 from Repco Inc. |
| RDP | Resorcinol bis(diphenyl phosphate), CAS Reg. No. 57583-54-7; obtained as CR-733S from Daihachi Chemical Industry. |
| LLDPE | Linear low density polyethylene, CAS Reg. No. 25087-34-7, having a density of 0.925 grams per cubic centimeter and a melt flow of about 20 grams/10 minutes measured at 190° C. and 2.16 kilogram load; obtained as NUCG-5381 from NUC Corporation. |
| Carbon Black | Carbon black (pigment); obtained as BLACK PEARLS ™ 800 from CABOT. |

Compositions were compounded on a 54 millimeter internal diameter Toshiba TEM extruder at a throughput of about 80 kilograms/hour, a screw rotation rate of about 300 rotations per minute, and barrel temperatures of 280 300 300 300 300 300 300° C. from feed throat to die. Glass fibers were added downstream to the extruder, while all other solid components were added at the feed throat and the liquid flame retardant was injected at a port between the feed throat and glass fiber feed location. The compounded resins were pelletized by strand cutting.

ASTM test parts for measurement of heat deflection temperature and flexural properties were injection molded on an 80 ton TOYO injection molding machine. Flamebars with 2.5 millimeter thickness were injection molded on a 100 ton Nissei injection molding machine.

Flammability testing was performed according to Underwriter's Laboratory Bulletin 94 "Tests for Flammability of Plastic Materials, UL 94", 500 w (125 mm) Vertical Burning Test. Before testing, flame bars with a thickness of 2.5 millimeters were conditioned at 23° C. and 50% relative humidity for at least 24 hours. Flammability performance was evaluated by average and maximum flame out time for five flamebars per composition.

Heat deflection temperature was determined at 23° C. according to ASTM D 648-07 using 6.4 millimeter thick bars and a stress of 1.82 megapascals. Flexural modulus and strength were determined at 23° C. according to ASTM D 790-10 using 6.4 millimeter thick bars. Melt volume flow rate (MVR) was determined according to ASTM D 1238-13 at 300° C. and a 2.16 kilogram load.

Compositions are summarized in Table 2, where component amounts are expressed in weight percent based on the total weight of the unpigmented composition. Relative to Comparative Examples 1-6 with rubber-modified polystyrene, inventive Examples 1-6 with homopolystyrene exhibit shorter flame out times, higher melt flow, higher stiffness, and only slightly lower heat resistance.

TABLE 2

| | Ex. 1 | C. Ex. 1 | Ex. 2 | C. Ex. 2 | Ex. 3 | C. Ex. 3 |
|---|---|---|---|---|---|---|
| COMPOSITIONS | | | | | | |
| PPE 0.33 | 0 | 0 | 0 | 0 | 0 | 0 |
| PPE 0.46 | 30 | 30 | 20 | 20 | 20 | 20 |
| PPE-Si | 5 | 5 | 5 | 5 | 5 | 5 |
| PS | 25 | 0 | 35 | 0 | 40 | 0 |
| PPE/PS | 0 | 0 | 0 | 0 | 0 | 0 |
| HIPS | 0 | 25 | 0 | 35 | 0 | 40 |
| Glass Fiber | 30 | 30 | 30 | 30 | 30 | 30 |
| Mica | 0 | 0 | 0 | 0 | 0 | 0 |
| RDP | 10 | 10 | 10 | 10 | 5 | 5 |
| LLDPE | 0 | 0 | 0 | 0 | 0 | 0 |

TABLE 2-continued

|  | | | | | | |
|---|---|---|---|---|---|---|
| Carbon Black | 1 | 1 | 1 | 1 | 1 | 1 |
| PROPERTIES | | | | | | |
| HDT (° C.) | 107 | 113 | 96 | 99 | 111 | 116 |
| Flexural Modulus (MPa) | 8,491 | 8,260 | 8,623 | 7,853 | 9,036 | 7,840 |
| Melt Volume Flow Rate (mL/10 min) | 10.7 | 6.0 | 14.7 | 8.4 | 9.8 | 5.0 |
| Flame out time, avg. (sec) | 9.4 | 12.4 | 11.8 | 11.9 | 16.9 | 30.4 |
| Flame out time, max. (sec) | 18.0 | 20.7 | 16.7 | 22.2 | 22.8 | 64.8 |

|  | Ex. 4 | C. Ex. 4 | Ex. 5 | C. Ex. 5 | Ex. 6 | C. Ex. 6 |
|---|---|---|---|---|---|---|
| COMPOSITIONS | | | | | | |
| PPE 0.33 | 0 | 0 | 0 | 0 | 0 | 0 |
| PPE 0.46 | 17 | 17 | 17 | 17 | 15 | 15 |
| PPE-Si | 5 | 5 | 3 | 3 | 5 | 5 |
| PS | 40 | 0 | 40 | 0 | 45 | 0 |
| PPE/PS | 0 | 0 | 0 | 0 | 0 | 0 |
| HIPS | 0 | 40 | 0 | 40 | 0 | 45 |
| Glass Fiber | 30 | 30 | 30 | 30 | 30 | 30 |
| Mica | 0 | 0 | 0 | 0 | 0 | 0 |
| RDP | 8 | 8 | 10 | 10 | 5 | 5 |
| LLDPE | 0 | 0 | 0 | 0 | 0 | 0 |
| Carbon Black | 1 | 1 | 1 | 1 | 1 | 1 |
| PROPERTIES | | | | | | |
| HDT (° C.) | 98 | 103 | 91 | 94 | 103 | 109 |
| Flexural Modulus (MPa) | 8,769 | 7,786 | 8,769 | 7,682 | 8,907 | 7,632 |
| Melt Volume Flow Rate (mL/10 min) | 15.1 | 8.2 | 19.0 | 10.5 | 12.1 | 7.7 |
| Flame out time, avg. (sec) | 16.2 | 24.5 | 13.7 | 14.9 | 19.6 | 22.5 |
| Flame out time, max. (sec) | 22.3 | 35.4 | 21.2 | 24.6 | 44.0 | 44.0 |

|  | Ex. 7 |
|---|---|
| COMPOSITIONS | |
| PPE 0.33 | 0 |
| PPE 0.46 | 0 |
| PPE-Si | 7 |
| PS | 9 |
| PPE/PS | 40.5 |
| HIPS | 0 |
| Glass Fiber | 20 |
| Mica | 10 |
| RDP | 12 |
| LLDPE | 1.5 |
| Carbon Black | 0 |
| PROPERTIES | |
| HDT (° C.) | 117 |
| Flexural Modulus (MPa) | 7,850 |
| Melt Volume Flow Rate (mL/10 min) | 22.4 |
| Flame out time, avg. (sec) | 4.5 |
| Flame out time, max. (sec) | 7.5 |

The invention claimed is:

1. A composition comprising, based on the total weight of polymers and fillers:
   0.5 to 91 weight percent of a poly(phenylene ether)-polysiloxane block copolymer reaction product comprising a first poly(phenylene ether) and a poly(phenylene ether)-polysiloxane block copolymer;
   5 to 90.5 weight percent of a second poly(phenylene ether);
   1 to 50 weight percent of homopolystyrene;
   3 to 25 weight percent of a flame retardant comprising an organophosphate ester, a phosphazene, or a combination thereof; and
   5 to 40 weight percent of reinforcing filler.

2. The composition of claim 1, comprising 2 to 20 weight percent of the poly(phenylene ether)-polysiloxane block copolymer reaction product, and 10 to 60 weight percent of the second poly(phenylene ether).

3. The composition of claim 1, excluding impact modifiers.

4. The composition of claim 1, wherein the homopolystyrene comprises an atactic homopolystyrene.

5. The composition of claim 1, wherein the flame retardant comprises the organophosphate ester.

6. The composition of claim 1, wherein the reinforcing filler is selected from the group consisting of glass fibers, carbon fibers, wollastonite, halloysite, clays, talcs, micas, glass flakes, solid glass beads, hollow glass beads, solid ceramic beads, hollow ceramic beads, and combinations thereof.

7. The composition of claim 1, wherein the reinforcing filler comprises glass fibers.

8. The composition of claim 1, wherein the reinforcing filler comprises mica.

9. The composition of claim 1,
   wherein the poly(phenylene ether)-polysiloxane block copolymer reaction product has an intrinsic viscosity of 0.3 to 0.5 deciliter per gram measured at 25° C. in chloroform;

wherein the first poly(phenylene ether) comprises repeat units selected from the group consisting of 2,6-dimethyl-1,4-phenylene ether, 2,3,6-trimethyl-1,4-phenylene ether, and combinations thereof;

wherein the poly(phenylene ether)-polysiloxane block copolymer comprises a poly(phenylene ether) block comprising repeat units selected from the group consisting of 2,6-dimethyl-1,4-phenylene ether, 2,3,6-trimethyl-1,4-phenylene ether, and combinations thereof; and a polysiloxane block having the structure

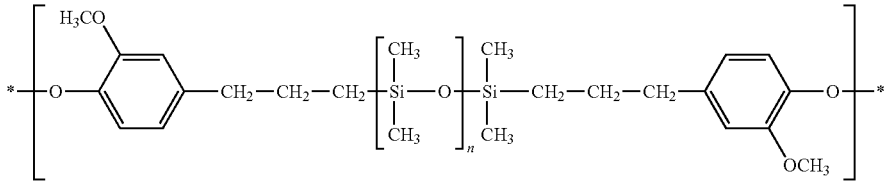

wherein n is, on average, 20 to 60;

wherein the second poly(phenylene ether) comprises repeat units selected from the group consisting of 2,6-dimethyl-1,4-phenylene ether, 2,3,6-trimethyl-1,4-phenylene ether, and combinations thereof;

wherein the homopolystyrene is an atactic homopolystyrene;

wherein the flame retardant is selected from the group consisting of resorcinol bis(diphenyl phosphate), bisphenol A bis(diphenyl phosphate), and combinations thereof;

wherein the reinforcing filler comprises glass fibers and mica; and wherein the composition comprises 2 to 10 weight percent of the poly(phenylene ether)-polysiloxane block copolymer reaction product, 25 to 45 weight percent of the second poly(phenylene ether), 15 to 40 weight percent of the homopolystyrene, 4 to 12 weight percent of the flame retardant, and 20 to 40 weight percent of the reinforcing filler comprising 10 to 35 weight percent of the glass fibers and 5 to 30 weight percent of the mica.

10. An article comprising a composition comprising, based on the total weight of polymers and fillers:

0.5 to 91 weight percent of a poly(phenylene ether)-polysiloxane block copolymer reaction product comprising a first poly(phenylene ether) and a poly(phenylene ether)-polysiloxane block copolymer;

5 to 90.5 weight percent of a second poly(phenylene ether);

1 to 50 weight percent of homopolystyrene;

3 to 25 weight percent of a flame retardant comprising an organophosphate ester, a phosphazene, or a combination thereof; and 5 to 40 weight percent of reinforcing filler.

11. The article of claim 10, selected from the group consisting of frames and chassis of office equipment, fuser module parts for printers, copiers, and facsimile machines, cooling fan blades, cooling fan housings, parts for automotive kinetic energy recovery systems, and parts for electric vehicle junction boxes.

12. The article of claim 10, wherein the composition excludes impact modifiers.

13. The article of claim 10, wherein the homopolystyrene comprises an atactic homopolystyrene.

14. The article of claim 10, wherein the flame retardant comprises the organophosphate ester.

15. The article of claim 10, wherein the reinforcing filler is selected from the group consisting of glass fibers, carbon fibers, wollastonite, halloysite, clays, talcs, micas, glass flakes, solid glass beads, hollow glass beads, solid ceramic beads, hollow ceramic beads, and combinations thereof.

16. The article of claim 10, wherein the reinforcing filler comprises glass fibers.

17. The article of claim 10, wherein the reinforcing filler comprises mica.

18. The article of claim 10, wherein the poly(phenylene ether)-polysiloxane block copolymer reaction product has an intrinsic viscosity of 0.3 to 0.5 deciliter per gram measured at 25° C. in chloroform;

wherein the first poly(phenylene ether) comprises repeat units selected from the group consisting of 2,6-dimethyl-1,4-phenylene ether, 2,3,6-trimethyl-1,4-phenylene ether, and combinations thereof;

wherein the poly(phenylene ether)-polysiloxane block copolymer comprises a poly(phenylene ether) block comprising repeat units selected from the group consisting of 2,6-dimethyl-1,4-phenylene ether, 2,3,6-trimethyl-1,4-phenylene ether, and combinations thereof; and a polysiloxane block having the structure

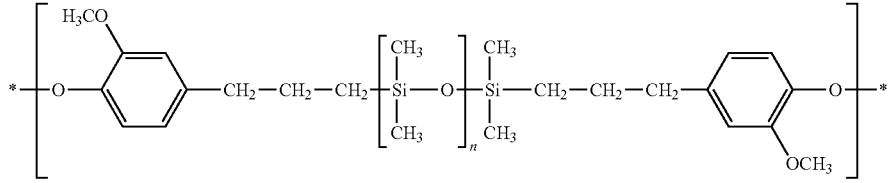

wherein n is, on average, 20 to 60;

wherein the second poly(phenylene ether) comprises repeat units selected from the group consisting of 2,6-dimethyl-1,4-phenylene ether, 2,3,6-trimethyl-1,4-phenylene ether, and combinations thereof;

wherein the homopolystyrene is an atactic homopolystyrene;

wherein the flame retardant is selected from the group consisting of resorcinol bis(diphenyl phosphate), bisphenol A bis(diphenyl phosphate), and combinations thereof;

wherein the reinforcing filler comprises glass fibers and mica; and wherein the composition comprises
- 2 to 10 weight percent of the poly(phenylene ether)-polysiloxane block copolymer reaction product,
- 25 to 45 weight percent of the second poly(phenylene ether),
- 15 to 40 weight percent of the homopolystyrene,
- 4 to 12 weight percent of the flame retardant, and 20 to 40 weight percent of the reinforcing filler comprising 10 to 35 weight percent of the glass fibers and 5 to 30 weight percent of the mica.

* * * * *